May 13, 1952     R. PYZEL     2,596,434
SYNTHESIS OF ORGANIC COMPOUNDS
Filed Aug. 20, 1947
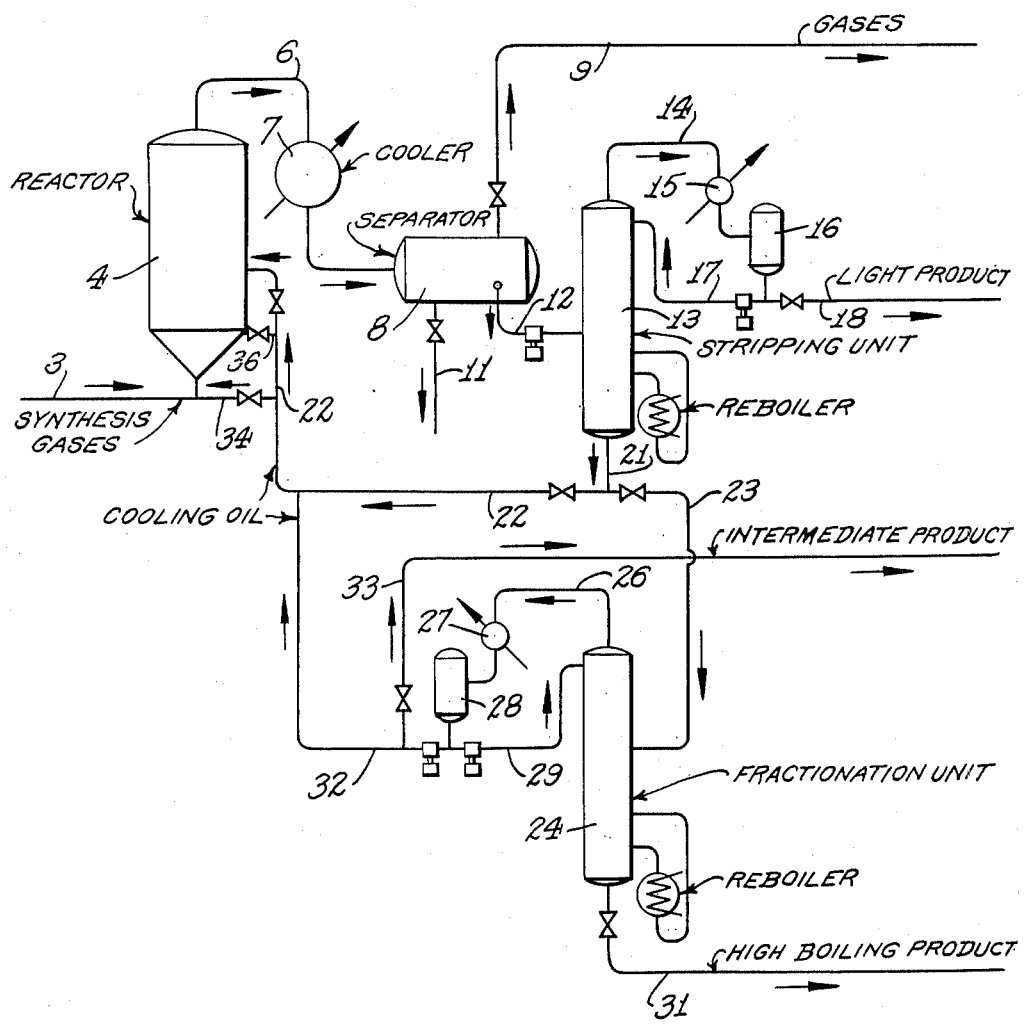
INVENTOR.
ROBERT PYZEL
BY E. F. Liebrecht
Cruzan Alexander
ATTORNEYS Patented May 13, 1952

2,596,434

UNITED STATES PATENT OFFICE 2,596,434

SYNTHESIS OF ORGANIC COMPOUNDS

Robert Pyzel, New York, N. Y., assignor to The M. W. Kellogg Company, Jersey City, N. J., a corporation of Delaware Application August 20, 1947, Serial No. 769,568

3 Claims. (Cl. 260—449.6)

This invention relates to the synthesis of organic compounds. In one aspect this invention relates to the hydrogenation of a carbon oxide under conditions such that hydrocarbons and oxygenated organic compounds are produced. In another aspect this invention relates particularly to a method for controlling the temperature of reaction in the synthesis of organic compounds from hydrogen and carbon monoxide in the presence of a fluidized suspended hydrogenation catalyst.

In the operation of a vapor phase catalytic reaction zone to produce hydrocarbons from carbon monoxide and hydrogen, which utilizes a quench or cooling oil to absorb reaction heat in order to maintain the desired operating temperature range in such a reaction zone, and wherein the heat absorption by the quench oil results in its complete vaporization, the desired operating temperature may be accurately established by using a quench oil of a predetermined boiling range so chosen that the quench oil will vaporize under the existing partial pressure conditions at the desired temperature level. The quench oil must not contain high-boiling materials which will not be vaporized in the reaction chamber.

In the operation of such a system, it is inevitable that when the vaporized quench oil which leaves the reaction zone is subsequently condensed, it will be contaminated by condensed reaction product inasmuch as the product of the reaction will have a boiling range overlapping that of the quench oil.

In the synthesis of hydrocarbons from carbon monoxide and hydrogen, the exothermicity of the reaction is so high that the quantity of quench oil which must be vaporized in order to maintain the reaction at a constant temperature level may be as much as 70 times the quantity of product produced by the reaction. The most suitable type of quench oil in this type of operation will consist of an intermediate cut of the product itself, and, after the quench oil has passed through the reaction zone wherein it is vaporized, it must be condensed so that it may be returned directly to the reaction zone or to the synthesis gas charged to this zone. The condensing may be accomplished in heat exchangers or heat recovery equipment, and the product of the reaction will also condense in such an equipment, i. e., at least all of the products which boil in the temperature range of the quench oil plus all products which boil at temperatures higher than this range.

Therefore, to obtain a quench oil out of the desired controlled boiling range, it is necessary to subject the condensate to (1) a topping or stripping operation to remove relatively lighter products which inadvertently have condensed with the relatively higher boiling quench oil and product, and (2) the topped material must be distilled overhead in a subsequent fractionating unit in order to remove relatively high-boiling product from it.

The first of these steps is a reasonable operation as regards costs and utility requirements compared to the main operation of the process, but the second operation would be quite out of line from this point of view, if carried out as stated above. In this second operation, the entire stream of quench oil would have to be vaporized in order to remove a small concentration of relatively high-boiling material.

It is an object of this invention to eliminate the necessity for complete vaporization of the quench oil to remove the aforesaid high-boiling material.

Another object of this invention is to provide a process for the synthesis of organic compounds.

It is another object of this invention to provide a method for cooling the reaction zone of a fluidized process for the synthesis of organic compounds in the presence of a finely divided catalyst.

It is another object of this invention to prevent the accumulation of relatively heavy organic compounds upon finely divided catalyst used in the synthesis of hydrocarbons by the fluidized technique.

Various other objects and advantages will become apparent to those skilled in the art.

According to the present invention hydrogen and a carbon oxide are reacted in the presence of a finely divided suspended catalyst in a reaction zone and the reaction zone is cooled by the direct injection therein of a vaporizable liquid oil fraction obtained as a product of the process. The desired fraction of cooling or quenching medium is recovered from the effluent of the synthesis process and returned as a liquid to the reaction zone. A minor portion of the cooling medium prior to introduction into the synthesis zone is by-passed through a fractionation unit wherein the higher boiling components of this fraction are removed. After removal of the higher boiling fraction, the remainder of the fraction is recombined with the major proportion of the cooling medium and injected directly into the fluidized catalyst mass in the reaction zone, or into the synthesis feed gases.

Controlling the amount of relatively high-boiling material from the quenching medium by removal from only a portion thereof is possible because the rate at which high-boiling material accumulates in the quench oil is slow, and because a fairly large contamination of the quenching medium by high-boiling material can be tolerated because the partial pressure conditions existing in the reaction zone are such that even a relatively high concentration of high-boiling material will nevertheless be vaporized at the temperature existing in the reaction zone.

The drawing is a view in elevation diagrammatically illustrating an arrangement of apparatus for the synthesis of hydrocarbons from a feed gas comprising hydrogen and carbon monoxide. According to this invention, 6,225 mols per hour of carbon monoxide and 12,625 mols per hour of hydrogen are passed to a conventional reaction zone 4 by means of conduit 3 in the drawing. In reaction zone 4, the gaseous mixture of hydrogen and carbon monoxide passes upward in contact with a finely divided catalyst, such as iron or cobalt, under conditions such that a pseudo-liquid dense phase of finely divided suspended catalyst is formed. The catalytic material may comprise any of those well-known materials suitable for the hydrogenation of carbon monoxide, such as iron, cobalt, nickel, and other metals of group VIII of the Periodic Table either in combination with themselves or supporting materials, such as alumina, bentonite type clay, silica gel, etc. The oxides of group VIII metals may also be used as catalysts. The reaction is effected in reactor 4 at a temperature between about 300° F. and about 650° F. and at a pressure between about atmospheric and about 500 pounds per square inch gage. A contact time between reactants and catalyst of about 2 to about 20 seconds is appropriate.

In order to control the temperature of reaction at a desired level within the reaction zone, a liquid oil fraction completely vaporizable under the conditions of operation in reactor 4 is injected directly into the feed line 3 through conduit 34 or directly into the pseudo-liquid dense phase of finely divided catalyst in reactor 4 through conduits 36 and 22. The composition and physical characteristics of the oil fraction used as a cooling medium, by virtue of its vaporization in reactor 4, will be discussed more fully hereinafter. The amount of oil thus introduced is sufficient to maintain the temperature at the desired level by the absorption of heat through latent heat of vaporization without indirect cooling of reactor 4; however, the direct injection of a liquid oil may be used in combination with indirect cooling, such as by indirect cooling coils within reactor 4, without departing from the scope of this invention.

A gaseous effluent is withdrawn from reactor 4 through conduit 6, cooled and condensed in a cooler 7, and then passed to a phase separator 8. A typical composition of a gaseous effluent from reactor 4 in conduit 6 is shown in Table I below.

TABLE I

*Products from the reactor*

(All gas or vapor)

A. 1,660 mols/hr. of CO
B. 2,625 mols/hr. of $H_2$
C. 6,135 mols/hr. of $CH_4$, $CO_2$, and $H_2O$
D. 356 mols/hr. of hydrocarbons boiling below I. B. P. quench oil
E. 80 mols/hr. of hydrocarbons boiling within quench oil range
F. 21,000 mols/hr. of quench oil
G. 27 mols/hr. of hydrocarbon boiling higher than E. P. of quench oil As the result of the cooling and partial condensation in cooler 7, items E, F, and G in Table I will be liquefied together with a part of item D. Water produced in the process also is condensed and collects as a separate lower phase in separator 8 and may be withdrawn therefrom through drain conduit 11. The upper liquid hydrocarbon layer in separator 8 is passed through conduit 12 to a conventional stripping unit 13 to remove, as overhead, the condensed item D of Table I. Unit 13 may comprise a single or a series of stripping columns. The overhead fraction will comprise hydrocarbons boiling below the initial boiling point of the quench oil, such as hydrocarbons boiling below pentane, and this fraction amounts to only a small part of the total product of the process as indicated in Table I. The relatively low-boiling hydrocarbons of the overhead fraction from stripper 13 are passed through conduit 14, cooler 15, to accumulator 16. In accumulator 16 a liquid phase is formed comprising liquefied hydrocarbons. A portion of this liquid phase may be recycled through conduit 17 to stripper 13 as reflux therefor. The remaining portion of the liquid phase from separator 16 is withdrawn as a relatively low-boiling product of the process through conduit 18. The bottom product of stripping unit 13 will consist of items E, F, and G of Table I. This material is essentially the cooling medium used for direct injection to reactor 4, except that it contains about 0.13 per cent of undesirable high-boiling material and has a boiling range between about 150 and about 350° F. (this would be the analysis after one hour's operation and constitutes about 21,000 mols or about 15,000 barrels of oil).

After the second hour of operation, the high-boiling material in this quench oil would amount to approximately 0.26%. The concentration of high-boiling material would continue to rise in this fashion with each hour's operation. During the operation of the system, it is necessary that a quantity equivalent to the product of equal boiling range to the quench oil (80 mols/hr.) and a quantity equal to the high-boiling material produced by the reaction (27 mols/hr.) be withdrawn from the inventory of the quench oil in order to maintain a constant quantity of quench oil.

On the above basis, it is clear that the high-boiling content of the quench oil will increase to relatively higher and undesirable value even after a few days' operation. For instance, after five days' operation the concentration of high-boiling material will be approximately 16 per cent. This figure is on the basis of a system which has a quench oil inventory equal to about one hour's quench oil rate, or 15,000 barrels with a unit capable of producing 5,000 barrels of product per day. In most instances, a unit of this capacity will have a quench oil inventory considerably less than 15,000 barrels, so that the rate of contamination of quench oil by high-boiling material will be more rapid than shown above.

It is definitely necessary that some provision be made in the design of the unit to continuously remove high-boiling material from the quench oil, and this is advantageously accomplished according to this invention by allowing the concentration of high-boiling material in the quench oil to build up to an allowable maximum, preferably not over 10 per cent, and to continuously subject a minor portion of the circulating quench oil stream to a cleaning-up fractionation, wherein such part of the quench oil is distilled overhead, while withdrawing from the fractionation high-boiling material as a bottom product at a rate equal to the rate at which this material is produced in the reactor. By this means, the amount of quench oil which must be vaporized in a fractionating operation is maintained at the minimum possible, while yet continuous operation of the unit, as a whole, is accomplished.

The removal of the undesirable heavy hydrocarbons from the cooling oil is accomplished according to the drawing by withdrawing the cooling oil fraction from stripper 13 through conduit 21 and dividing the oil into two streams; one stream comprising the major proportion passing directly to reactor 4 through conduit 22, and the other and smaller stream passing through conduit 23 to a conventional fractionation unit 24 which may comprise a single or a series of distillation columns. In fractionation unit 24 the undesirable heavy products of the process are removed from this fraction and withdrawn from unit 24 through conduit 31. The high-boiling material may constitute a high-boiling product of the process. The overhead from fractionation unit 24 is removed therefrom through conduit 26 and passed through condenser 27 to accumulator 28 in which condensate is collected. In accumulator 28 a portion of the condensate is returned through conduit 29 to fractionation unit 24 as liquid reflux. The remaining proportion of the condensate in accumulator 28 is passed through conduit 32 and recombined with the main portion of the cooling medium in conduit 22. A portion of the overhead from conduit 32 may be withdrawn through conduit 33 as an intermediary product of the process. The amount of material passed through conduit 23 from stripping unit 13 to fractionation unit 24 is so controlled that the amount of undesirable heavy hydrocarbons removed from the by-pass cooling medium stream is sufficient to maintain the composition of heavy hydrocarbons in the main stream of cooling medium substantially constant or at the desired value. In the event product is withdrawn from the system through conduit 33, the amount of material diverted through conduit 23 will be increased proportionately.

The concentration to which the boiling material may be allowed to build up in the quench oil is determined by (1) the boiling range of the high-boiling material, (2) the partial pressure conditions in the reactor, and (3) the temperature in the reactor. Item (1) of these will vary greatly depending upon the manner of operation of the unit, the type of catalyst used, etc. Items (2) and (3) will also vary depending on such factors as the product produced, the catalyst, and the composition of feed gases.

For illustrative purposes in accordance with the process discussed with reference to the drawing, these three above items are such that the quench oil may contain up to about 5 per cent of high-boiling material. In other words, that when the quench oil carries as much as 5 per cent of the particular quality of high-boiling material being produced, this material will yet be completely vaporized in the reactor as a result of the partial pressures and temperature existing in the reactor. The column for removing high-boiling material must remove about 27 mols/hr. of this material by processing a certain quantity of quench oil containing this material in a 5 per cent concentration. Assume that the column is operated to reduce this concentration to 2 per cent; in other words, that it will remove the other 3 per cent of the high-boiling material. The feed to this column must then be $$\frac{27}{3} \times 100 = 900 \text{ mols/hr.}$$

or approximately 650 barrels/hrs. of quench oil containing 5 per cent high-boiling material, and this column will produce, as overhead material, approximately 630 barrels of quench oil containing 2 per cent high-boiling material.

Thus, the over-all operation will involve a quench oil stream recycling direct to reactor 4 from the bottom of the stripping column 13 at a rate of 14,370 barrels/hr., and will involve passing 650 barrels/hr. of quench oil through column 24 wherein the high-boiling content from this quench oil is reduced from 5 per cent to 2 per cent, and adding the purified quench oil, now amounting to 630 barrels/hr., to the 14,370 barrels/hr. of the directly circulating quench oil, to provide for the reactor the required 15,000 barrels/hr. of quench oil containing slightly less than 5 per cent high-boiling material. Generally, less than about 5 per cent by volume of the bottom product from stripping unit 13 is diverted to fractionation unit 24 to remove the undesirable high-boiling components.

The above discussion is based on using substantially only the latent heat of vaporization of the quench oil to absorb reaction heat. In other words, it is contemplated that the quench oil enters the reactor as a liquid substantially at its boiling point and leaves the reactor as a vapor substantially at its boiling point. Such a procedure has the advantage that the reaction heat may be recovered in subsequent equipment at the highest possible temperature levels, but it has the disadvantage of requiring the largest quench oil circulating rate.

An alternative operation then may be used in which the quench oil is charged to the reactor at a temperature well below its boiling range, such as 50 to 100° F. or more below the boiling temperature at the conditions of operation. In this case, the specific heat of the quench oil between its entering temperature and its boiling range also serves to absorb reaction heat and hence the quantity of quench oil which must be circulated to remove the reaction heat may be reduced, but in this case only a part of the reaction heat may be recovered at the highest temperature level, the remainder being recovered (or wasted) in cooling the condensed quench oil to lower temperatures. In accordance with the above modification, the quench oil in conduit 22 may be cooled by a cooler not shown.

Although the present invention has been described with reference to specific conditions of operation and quantities of recycle quench oil, these specific conditions should not be construed to unnecessarily limit the present invention. Various equipment, such as coolers, valves, pumps, heat exchange units and by-pass lines have been omitted from the drawing as a matter of convenience and clarity, and their location and use will become apparent to those skilled in the art without departing from the scope of this invention.

Having described my invention, I claim:

1. In a process for the hydrogenation of a carbon oxide to produce organic compounds as products of the process in which hydrogen and carbon monoxide are passed upward through a mass of finely divided hydrogenation catalyst under conditions such that the catalyst is suspended in a pseudo-liquid fluidized condition at a temperature between about 300 and about 650° F. and at a pressure between about atmospheric and about 500 pounds per square inch gage, and in which a liquid organic fraction substantially completely vaporizable under the conditions of reaction is injected directly into said suspended mass of catalyst as a cooling medium to maintain the temperature within the above range at the desired level, the improvement which comprises cooling and condensing an effluent from the hydrogenation reaction to form a liquid phase comprising relatively high and relatively low-boiling organic compounds, stripping said liquid phase of relatively low-boiling organic compounds boiling below the initial boiling point of the aforesaid cooling medium, subjecting less than about 5 volume per cent of the stripped liquid phase to fractionation under conditions such that relatively high-boiling organic compounds boiling above the end boiling point of the aforesaid liquid organic fraction are removed, combining a relatively low-boiling fraction from said fractionation with stripped liquid, and injecting the resulting liquid mixture into the pseudo-liquid dense phase of catalyst as a means for maintaining the reaction at the desired temperature level.

2. In a process for the hydrogenation of a carbon oxide to produce organic compounds as products of the process in which hydrogen and carbon oxide are passed upward through a mass of suspended finely divided hydrogenation catalyst, and in which a liquid organic fraction substantially completely vaporizable under the conditions of reaction is injected into the suspended finely divided catalyst as a cooling medium, the improvement which comprises cooling and condensing an effluent from the hydrogenation reaction to form a liquid phase comprising relatively high-boiling and relatively low-boiling organic compounds, stripping the liquid phase of relatively low-boiling organic compounds boiling below the initial boiling point of said cooling medium, subjecting less than about 5 volume per cent of the stripped liquid phase to fractionation to remove relatively high-boiling organic compounds boiling above the end boiling point of said cooling medium, combining a relatively low-boiling portion of said fractionated liquid phase with stripped liquid, and injecting the resulting liquid mixture into said mass of finely divided catalyst as a cooling medium.

3. The process of claim 2 in which the hydrogenation catalyst comprises iron.

ROBERT PYZEL.

REFERENCES CITED

The following references are of record in the file of this patent:

UNITED STATES PATENTS

| Number | Name | Date |
|---|---|---|
| 2,406,851 | Redcay | Sept. 3, 1946 |
| 2,411,760 | Sensel | Nov. 26, 1946 |
| 2,417,164 | Huber, Jr. | Mar. 11, 1947 |
| 2,438,029 | Atwell | Mar. 16, 1948 |
| 2,474,845 | Jenny et al. | July 5, 1949 |